(12) United States Patent
Koll et al.

(10) Patent No.: US 10,062,375 B2
(45) Date of Patent: *Aug. 28, 2018

(54) SPEECH RECOGNITION USING AN OPERATING SYSTEM HOOKING COMPONENT FOR CONTEXT-AWARE RECOGNITION MODELS

(71) Applicant: MModal IP LLC, Franklin, TN (US)

(72) Inventors: Detlef Koll, Pittsburgh, PA (US); Michael Finke, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,523

(22) Filed: Oct. 26, 2016

(65) Prior Publication Data

US 2017/0047061 A1    Feb. 16, 2017

Related U.S. Application Data (63) Continuation of application No. 13/526,789, filed on Jun. 19, 2012, now Pat. No. 9,489,375.

(Continued)

(51) Int. Cl.
| | |
|---|---|
| *G06F 17/20* | (2006.01) |
| *G10L 21/00* | (2013.01) |
| *G10L 15/06* | (2013.01) |
| *G06F 17/27* | (2006.01) |
| *G10L 15/183* | (2013.01) |
| *G06F 3/0481* | (2013.01) |

(Continued)

(52) U.S. Cl.
CPC ........ *G10L 15/063* (2013.01); *G06F 3/04817* (2013.01); *G06F 17/276* (2013.01); *G10L 15/183* (2013.01); *G10L 15/22* (2013.01); *G06F 9/4448* (2013.01); *G06F 9/454* (2018.02); *G10L 15/265* (2013.01); *G10L 2015/0635* (2013.01); *G10L 2015/223* (2013.01)

(58) Field of Classification Search
CPC .............................. G06F 9/4448; G10L 15/265
USPC ...................................... 704/8, 275
See application file for complete search history.

(56) References Cited

U.S. PATENT DOCUMENTS

| | | |
|---|---|---|
| 7,603,277 B2 | 10/2009 | Kashima |
| 2006/0074656 A1 | 4/2006 | Mathias et al. |

(Continued)

FOREIGN PATENT DOCUMENTS

EP         0954856        4/2003

*Primary Examiner* — Farzad Kazeminezhad
(74) *Attorney, Agent, or Firm* — Blueshift IP, LLC; Robert Plotkin (57) ABSTRACT

Inputs provided into user interface elements of an application are observed. Records are made of the inputs and the state(s) the application was in while the inputs were provided. For each state, a corresponding language model is trained based on the input(s) provided to the application while the application was in that state. When the application is next observed to be in a previously-observed state, a language model associated with the application's current state is applied to recognize speech input provided by a user and thereby to generate speech recognition output that is provided to the application. An application's state at a particular time may include the user interface element(s) that are displayed and/or in focus at that time, and is determined by an operating system hooking component embedded in the automatic speech recognition system.

19 Claims, 4 Drawing Sheets

Related U.S. Application Data

(60) Provisional application No. 61/498,591, filed on Jun. 19, 2011.

(51) Int. Cl.
  *G10L 15/22* (2006.01)
  *G06F 9/44* (2018.01)
  *G10L 15/26* (2006.01)
  *G06F 9/451* (2018.01)

(56) References Cited

U.S. PATENT DOCUMENTS

| | | |
|---|---|---|
| 2007/0038449 A1 | 2/2007 | Coifman |
| 2010/0070268 A1 | 3/2010 | Sung |
| 2010/0169098 A1* | 7/2010 | Patch ............................ 704/275 |

* cited by examiner

SPEECH RECOGNITION USING AN OPERATING SYSTEM HOOKING COMPONENT FOR CONTEXT-AWARE RECOGNITION MODELS

BACKGROUND

Various automatic speech recognition (ASR) systems exist for recognizing speech to create transcripts of such speech and to control software applications. For example, one common use of ASR systems is to enable users to dictate text to be inserted into a word processing document and to control user interface (UI) elements of the word processing application (such as windows, menus, and dialog boxes). For example, when using an ASR system in connection with a word processing application, it may be possible for the user to use a voice command to cause a "Font" dialog box to be displayed and then to use other voice commands to enter a font name into the dialog box and to click on an "OK" button within the dialog box to cause the desired font to be applied to selected text and/or or to be applied to text subsequently typed by the user.

As is clear from even such a simple example, the target application (e.g., word processor) may have a variety of application states, such as a "text entry" state in which mouse and keyboard input provided by the user is interpreted as text to be inserted into the currently-open document and as commands for controlling the window containing the currently-open document, and a "font dialog box" state in which mouse and keyboard input provided by the user is interpreted as commands for controlling user interface elements of the "Font" dialog box and as text to be entered into text fields of the "Font" dialog box. Any ASR system that interacts with such an application must be capable of interacting correctly with the application based on the current state of the application.

One typical way to coordinate an ASR with the state of the target application (e.g., word processor) is to tightly integrate the ASR with the target application. For example, the target application may be designed or modified to be aware of the ASR's speech recognition engine, to appropriately configure the speech recognition engine for use in various application states, and to interpret the speech recognition results appropriately in such application states. For example, a word processing application may be designed to configure the speech recognition engine to use a first particular language model when the word processing application is in a "text entry" state (such as a general English language model), and to configure the speech recognition engine to use a second particular language model when the word processing application is in a "font dialog box" state (such as a "font dialog box" language model which is limited to recognizing only the names of fonts currently installed on the target computer).

One benefit of such tight integration between the speech recognition engine and the target application is that it can increase speech recognition accuracy by enabling the speech recognition engine to use an appropriate language model and to otherwise be appropriately configured for each state of the target application. Another benefit of such tight integration is that the configuration of the speech recognition engine and the interpretation of the speech recognition engine's results do not have to be directly tied to visual features of the application state, such as the size, location, or text labels of buttons and other user interface elements.

A significant disadvantage, however, of such tight integration is that it requires the speech recognition engine and the target application to be designed or modified to be integrated with each other in this way in advance. Such integration, therefore, can require not only significant manual effort to tailor the speech recognition engine to interact appropriately with the various states of the target application, but may also require access to the source code or other internals of the target application that may not be available to the designer of the speech recognition engine. Furthermore, when relying on tight integration, the speech recognition engine is only usable with target applications for which it has been designed to tightly integrate. As a result, such a speech recognition engine will not be capable of achieving the same benefits when used in connection with target applications with which it has not been specifically designed to integrate, and may not even be capable of interacting correctly with modified versions of the same target application.

In general it is desirable for automatic speech recognition systems to be usable with a wide variety of target applications, such as word processors, web browsers, email clients, and database applications, with high recognition accuracy in all of the various states of such target applications. Yet, as the discussion above illustrates, attempting to achieve such interoperability between automatic speech recognition systems and target applications through tight integration of the two can be tedious, time-consuming and, in many cases, not possible from a practical standpoint. Various other approaches for enabling automatic speech recognition systems to interoperate with a wide variety of target applications in their various states have their own drawbacks. What is needed, therefore, are improved techniques for enabling automatic speech recognition systems to interoperate with a wide variety of target applications in the various states of such applications easily and with high recognition accuracy.

SUMMARY

In one aspect, a method includes receiving a first plurality of inputs into an application while the application is in a first state. The method includes training a first language model based on the first plurality of inputs. The method includes determining that the application is in the first state. The method includes applying the first language model to a first speech input in response to determining that the application is in the first state.

In another aspect, an automatic speech recognition system includes an input receiver receiving a first plurality of inputs into an application while the application is in a first state. The system may include a language model trainer training a first language model based on the first plurality of inputs. The system may include a language model selection component determining that the application is in the first state. The system may include a language model application component applying the first language model to a first speech input in response to determining that the application is in the first state. The system may include a computing device executing an operating system that in turn executes the automatic speech recognition system and the application. In distributed models in which the automatic speech recognition system and the application execute on different computing devices, the system may include a plurality of computing devices.

Other features and advantages of various aspects and embodiments of the present invention will become apparent from the following description and from the claims.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

As mentioned above, one common way to enable an automatic speech recognition (ASR) system to interoperate with a target application (e.g., word processor), regardless of the state of the target application at any particular time, is to tightly integrate the ASR with the target application. Due to the drawbacks of this approach, other attempts have been made to enable ASR systems to interoperate with target applications. For example, one such approach is to enable the ASR system to interact with the target application through generally applicable interfaces, such as:

keyboard emulation, in which the ASR engine submits text and/or control sequences to the target application by emulating keyboard events, so that the target application can receive and process such events as though they were generated in response to keyboard input by the user;

clipboard transfer, in which the ASR engine posts the speech recognition results to the operating system's "clipboard" and sends a "paste" event to the target application to cause the speech recognition results to be provided to the target application as if the user had performed copy and paste operations on text;

operating system messages transmitted by the ASR system to the target application;

pointing device (e.g., mouse) emulation; and introspection of the operating system and target application using standard operating system introspection functionality, to enable the ASR system to obtain information about which target application currently is in the foreground, and to identify the target application's current state, such as the user interface elements (e.g., windows, menus, dialog boxes, buttons, and text fields) currently displayed by the target application and the identity of the user interface element(s) currently having the input focus.

One benefit of this class of approaches is that they enable the ASR system to interoperate with the target application without requiring the target application to be modified to accept speech input or to affirmatively configure the ASR system. Instead, responsibility for ensuring that the ASR system is configured appropriately in light of the target application's current state, and for ensuring that the correct inputs are provided to the target application, rests solely with the ASR system. For example, when using introspection, the ASR system may configure its command and control grammars to activate only those commands that are applicable to the application that is currently in the foreground, such as by activating a "send mail" command but not a "reload web page" command when an email client application (e.g., Microsoft Outlook) is in the foreground. As another example, if a dialog box is in focus in the foreground application, the ASR system may activate commands for controlling user interface elements in the dialog box (such as commands for selecting buttons within the dialog box) and deactivate commands for controlling the application menu if the menu is not selectable while the dialog box is displayed.

The approaches just described, however, have a variety of limitations. For example, using introspection to configure an ASR system is limited to configuring the ASR system based on conclusions that can be drawn from introspection. For example, although introspection can enable the conclusion that a particular dialog box is in focus and contains "OK" and "Cancel" buttons, introspection alone cannot enable any conclusion to be drawn about the relative probabilities of the user selecting the "OK" and "Cancel" buttons. More generally, because introspection is based on static information, such as whether a particular user interface element has the focus at a particular time, or whether particular user interface elements are present at a particular time, introspection alone cannot enable conclusions based on dynamic information, such as the ways in which one or more users use an application's user interfaces over time.

In contrast, embodiments of the present invention may be used to observe the use of an application and its user interfaces over time, and to draw conclusions about how one or more users use such interfaces over time.

Figure 1A:
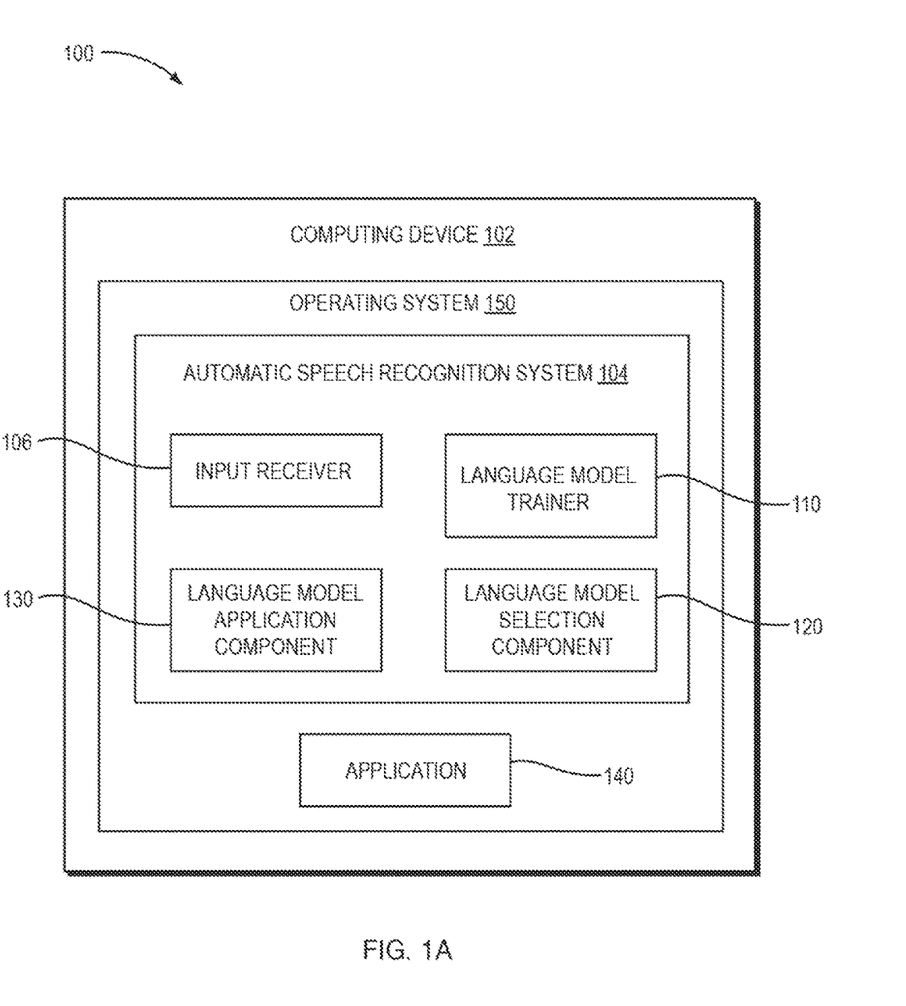
FIG. 1A is a block diagram depicting one embodiment of a system for speech recognition using context-aware recognition models.
Figure 2:
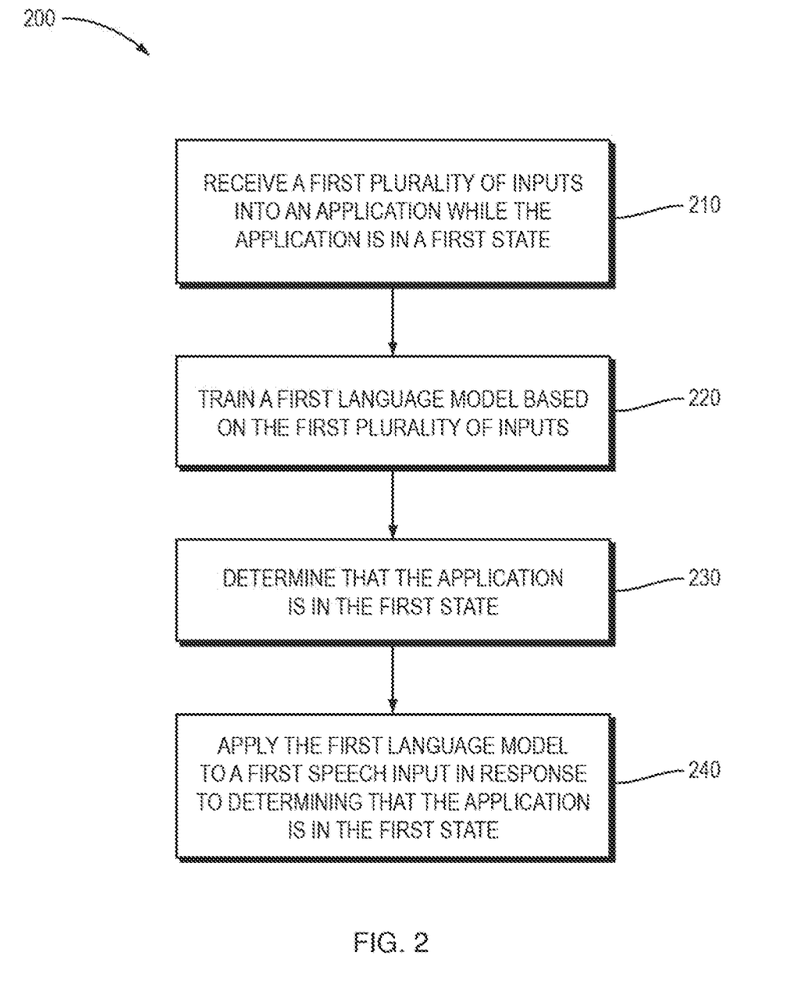
FIG. 2 is a flow diagram depicting one embodiment of a method for speech recognition using context-aware recognition models.

Referring now to FIG. 1A, in connection with FIG. 2, method 200 and systems 100 for speech recognition using context-aware recognition models include an automatic speech recognition system 104. The method 200 includes receiving a first plurality of inputs into an application while the application is in a first state 210. The method 200 includes training a first language model based on the first plurality of inputs 220. The method 200 includes determining that the application is in the first state 230. The method 200 includes applying the first language model to a first speech input in response to determining that the application is in the first state 240. For example, embodiments of the present invention may include observing, by the automatic speech recognition system 104 (which may also be referred to as an ASR system 104), the use of a particular user interface of an application over time, identifying a pattern of use of that particular user interface, and using the identified pattern of use to configure the ASR system 104 for use with that particular user interface, such as by selecting and/or configuring a particular language model for use by the ASR system 104 in connection with that particular user interface. As will be understood by one of ordinary skill, a user interface may include one or more user interface elements. Any reference herein to input provided to a "user interface" includes providing input to a user interface that includes one or more user interface elements.

The method 200 includes receiving a first plurality of inputs into an application while the application is in a first state 210. The ASR system 104 may receive the first plurality of inputs into the application 140. The application 140 may be, for example, an executable application developed for text-based interaction, independently from the ASR and its speech-based interface. Both the ASR system 104 and the application 140 may execute in the operating system 150 on the same computing device 102. Alternatively, the ASR system 104 may execute on the computing device 102 and the application 140 may execute on a second computing device 102b (not shown).

In some embodiments, the automatic speech recognition system 104 includes an input receiver 106 receiving the first plurality of inputs. The input receiver 106 may receive application data, identifications of a state of an application, and/or various types of inputs including text, speech, and mixed text and speech inputs.

For example, the input receiver 106 may receive the first plurality of inputs from a text-based input device, such as, by way of example, a keyboard. The input receiver 106 may receive the first plurality of inputs from a pointing device, such as, by way of example, a mouse or stylus. The input receiver 106 may receive the first plurality of inputs from a speech input device, such as, by way of example, a microphone. In some embodiments, the input receiver 106 receives a text-based input that the ASR system 104 generated based on a speech input. The input receiver 106 may receive a combination of types of input within the first plurality of inputs; for example, the input receiver 106 may receive a combination of speech-based input, text-based input and input from a pointing device in the first plurality of inputs.

Figure 1B:
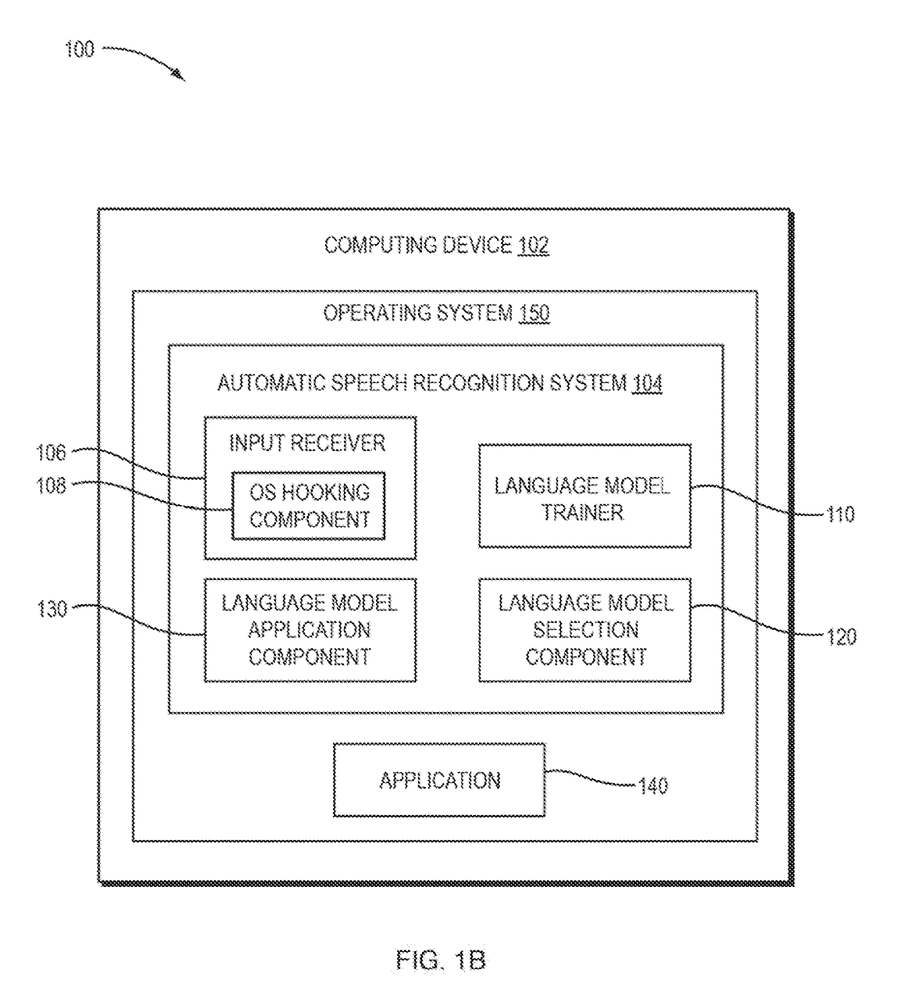
FIG. 1B is a block diagram depicting one embodiment of a system in which an automatic speech recognition system includes an operating system hooking component.

In some embodiments, the input receiver 106 receives the first plurality of inputs from the operating system 150 in which both the ASR system 104 and the application 140 execute. In other embodiments, the input receiver 106 receives the first plurality of inputs via introspection of the operating system 150 and of the application 140 using standard operating system introspection functionality, to enable the ASR system 104 to obtain information about which target application currently is in the foreground, and to identify the target application's current state, such as the user interface elements (e.g., windows, menus, dialog boxes, buttons, and text fields) currently displayed by the target application and the identity of the user interface element(s) currently having the input focus. For example, and as shown in FIG. 1B, the ASR system 104 may include an operating system hooking component 108 that intercepts messages between the application 140 and the operating system 150 in order to determine a state of the application 140, to receive application data of the application 140 generally, or to receive the first plurality of inputs in particular.

The method 200 includes training a first language model based on the first plurality of inputs 220. The automatic speech recognition system 104 trains the first language model based on the first plurality of inputs. In some embodiments, a language model trainer 110, as shown in FIG. 1A, may train the language model. Note that the term "language model" is used broadly herein to include, for example, grammars. Grammars, and language models generally, may be applied to instances of "concepts." For example, if the ASR system 104 determines that a user interface element (e.g., a text field) receives as inputs multiple instances of a single concept, the ASR system 104 may configure itself to categorize subsequent inputs to the user interface element as instances of the concept and to apply a particular language model to the subsequent inputs. Concepts may be defined at any level of abstraction. For example, the ASR system 104 may identify "October 1, 1993," "September 3, 2007," and "March 12, 1942" as instances of the general "date" concept. As another example, the ASR system 104 may identify "October 1, 1993," "10/01/1993," and "Oct 01 1993" as all being instance of the more specific concept of Oct. 1, 1993. Furthermore, a concept may include one or more parameters, each of which may have a type and a corresponding value. A single concept may include a plurality of parameters of varying types. For example, an instance of a "date" concept may include "month," "day," and "year" parameters, each of which may have a corresponding value. In the example above, each of "October", "Oct", and "10" is an example of a value of the "month" parameter of an instance of a "date" concept.

If an embodiment of the present invention observes that various different dates have been dictated into a text field, the ASR system 104 may be configured to categorize those inputs as instances of a "date" concept and to apply a "date" grammar when recognizing speech that is dictated into that text field. Such a "date" grammar is an example of a "language model" as that term is used herein. In some instances, language models indicate a probability of a word (which may also be referred to as a "token") occurring given the words that preceded it; for example, a language model may indicate the probability of the next spoken word being "hat" given the fact that the words previously spoken were "A cat in a". The date grammar that is applied may either be a generic date grammar or a date grammar that is further adapted based on the dates that have been dictated into the text field. For example, if all of the dates that have been dictated into the text field have been dictated in the form "MONTH DAY YEAR," then a "date" grammar of the form "MONTH DAY YEAR" may be applied to the text field. This is merely one example of a way in which embodiments of the present invention may apply a grammar or other kind of language model to a user interface element or collection of user interface elements.

Another example of configuring the ASR system 104 is adapting a dictionary to reflect the fact, for example, that pronunciation of a word may vary depending on the context in which it is spoken. For example, the abbreviation "PA" may be pronounced as "PEE AY" when used to designate a public address system in a text field for listing equipment, but be pronounced as the word "Pennsylvania" when dictating into a field for inputting the name of a state. Yet another example of configuring the ASR system 104 is configuring arbitration parameters, which are parameters that govern whether to interpret any given utterance as a grammar or as text.

It should be understood that the systems described herein may include different types of parameters for different components; for example, the ASR system 104 may have an arbitration parameter as described here while concepts may have parameters that identify sub-concepts within a main concept (e.g., a month within a date). Although the word "parameter" is used to describe both such types of parameters, this is not meant to imply that both such types of parameters are the same type of parameter.

The same techniques may be applied to another user interface of the same application to identify a different pattern of use of that other user interface, and to use that different pattern of use to configure the ASR system 104 for use with the other user interface. As a result, the ASR system 104 may be configured for use differently in connection with different states of the application, based on patterns of use that are learned dynamically and automatically. The same techniques may be applied across applications.

The ASR system 104 may receive additional inputs and modify or re-train a language model as it receives additional information. For example, the ASR system 104 may receive a first plurality of inputs into the application while the application is in a first state and then receive a second plurality of inputs while the application is in the first state; for instance, the ASR system 104 may receive the second plurality of inputs from another computing device 102b executing a second copy of the application 140 or during a second session with the application 140 (e.g., when the application 140 is in use by the same or a different user).

Furthermore, the ASR system 104 may train multiple language models. For instance, the ASR system 104 may train a first language model based on a first plurality of inputs into an application in a first state and then receive a second plurality of inputs into the application while the application is in a second state that differs from the first state; the ASR system 104 may then train a second language model based on the second plurality of inputs and apply the second language model to second speech input in response to determining that the application is in the second state.

The techniques just described may be used for any kind of user interface element and for any combination of user interface elements. Examples of user interface elements to which embodiments of the present invention may be applied include, but are not limited to, windows, menus, dialog boxes, buttons, checkboxes, radio buttons, dropdown lists, and text fields. As the examples of menus and dialog boxes illustrate, embodiments of the present invention may be applied to a collection of user interface elements such as a menu containing multiple menu items or a dialog box containing multiple buttons, checkboxes, text fields, and other user interface elements.

As one example, embodiments of the present invention may observe the inputs that are provided into a particular user interface element in a particular application over time. For example, consider a particular text field in a particular dialog box in a particular application. Because users may enter any text into the text field, it is not possible for an ASR system to tailor its language model for that text field based solely on introspection of the dialog box. As a result, conventional ASR systems would typically apply a generic English language model to such a text field.

Embodiments of the present invention, however, may observe the text inputs that are input into the particular text field over time and tailor the language model that is associated with the text field based on the observed inputs. As one example, the frequency of input of different text into the text field may be observed, and a language model may be tailored for and associated with the text field based on the observed frequencies. For example, if it is observed that a first text string (such as "High") is input into the text field with a frequency of 50%, that a second text string (such as "Medium") is input into the text field with a frequency of 30%, and that a third text string (such as "Low") is input into the text field with a frequency of 20%, then a language model may be generated which assigns a probability of 50% to the text string "High," a probability of 30% to the text string "Medium," and a probability of 20% to the text string "Low." Alternatively, for example, a generic English language model may initially be associated with the text field, and the probabilities of words in that language model may be adjusted upward in response to observing that the user has input those words into the text field, and the probabilities of words in that language model may be adjusted downward in response to observing that the user has not input those words into the text field.

Figure 1C:
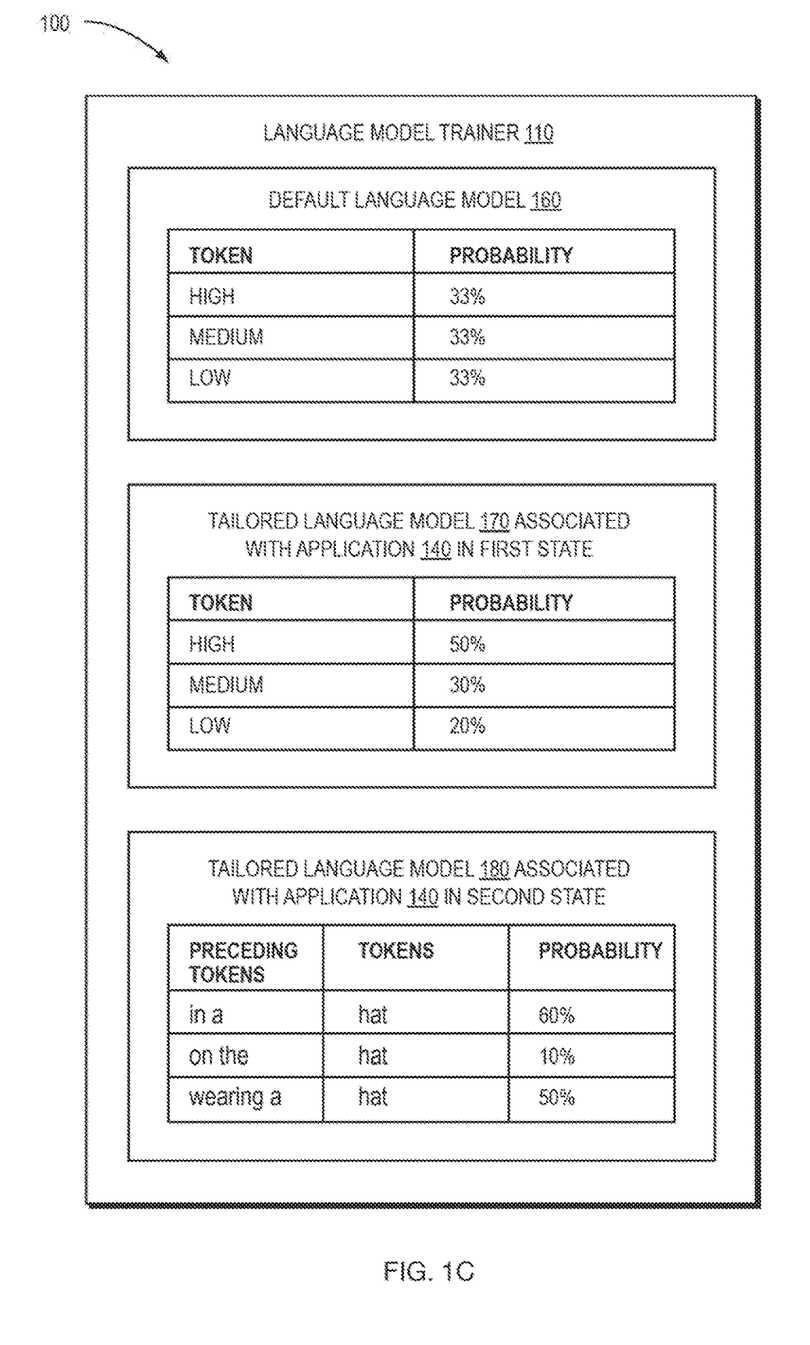
FIG. 1C is a block diagram depicting one embodiment of a system including tailored language models.

Referring now to FIG. 1C, a block diagram depicts one embodiment of language models. The language models in FIG. 1C are shown in greatly simplified form for ease of illustration and explanation. In practice, language models may vary from those shown in FIG. 1C in a variety of ways.

As shown in FIG. 1C, the language model trainer 110 may have access to a default language model 160, as well as to a tailored language model 170. For example, the language model trainer 110 may have access to a plurality of language models with default settings and the language model trainer 110 may customize one or more of the language models to generate tailored language models associated with particular applications in particular states such as, by way of example, the tailored language model 170 associated with the application 140 when the application 140 is in a first state. As shown in FIG. 1C, the tailored language model 170 may be a unigram model, in which the probability associated with each token is a probability of the token occurring, independently of the occurrence of any previous tokens. A unigram language model is only one example of a kind of language model that may be used in connection with embodiments of the present invention. As another example, and as shown in tailored model 180, the language model trainer 110 may generate a tailored model that is an n-gram language model, where n is any value (e.g., 1, 2, 3, 4, etc.). For example, and as shown in FIG. 1C, the tailored language model 180 may a trigram (n=3) language model, which indicates that the token "hat" has a 60% probability of occurring given that the immediately-preceding tokens are "in a", that the token "hat" has a 99% probability of occurring given that the immediately-preceding tokens are "on the", and that the token "hat" has a 50% probability of occurring given that the immediately-preceding tokens are "wearing a". As shown in FIG. 1C, the default language model 160 might indicate equal probabilities for particular input values, but with the use of the ASR system 104 and functionality for tailoring the language models based on observed inputs as shown in the tailored language models 170 and 180, the system 100 may provide increased accuracy in the tailored language models.

In some embodiments, therefore, the ASR system 104 uses text-based inputs to tailor the language model. A user may sometimes enter text into a text field directly by manually entering text into the text field; alternatively, the user may enter text indirectly by speaking and having the speech transcribed into text by the ASR system 104. In either situation, the ASR system 104 may observe the text field input to train the language model. As described herein, the system may also use various kinds of speech input for training. The term "speech input" as used herein may include audio input representing the user's speech and/or output generated by an ASR system 104 based on the user's speech (such as text and/or commands generated based on the user's speech). Input generated from speech using language models that have been trained using the techniques disclosed herein may be included or excluded as training data. Embodiments of the present invention may include or exclude mistakes (i.e., incorrect speech recognition results) for use in training. Even though using mistakes as training data may result in generation of incorrect output, it may result in generating the same wrong output consistently, thereby reducing output variability, and potentially enabling the incorrect output to be corrected using output correction techniques (e.g., spelling correction techniques).

Similar techniques may be applied to user interface elements other than text fields. For example, consider a dropdown list that contains three list elements: "High," "Medium," and "Low." Although these list elements may be learned and used to generate a language model using conventional introspection-based techniques, such techniques will result in a language model that assigns equal probabilities of one-third to each of the three list elements. In contrast, embodiments of the present invention may observe the actual frequencies with which such list elements are selected. If, for example, the list element "High" is selected with a frequency of 50%, the list element "Medium" is selected with a frequency of 30%, and the list element "Low" is selected with a frequency of 20%, then a language model may be generated or modified based on such frequencies in any of the ways described above. As a result, when speech is recognized to select one of the three list elements, the recognition may be performed more accurately. This is particularly true, for example if two list elements are pronounced similarly (e.g., "Medium" and "Median") but have significantly different probabilities (e.g., 50% and 1%). Therefore, in some embodiments, training the language model includes associating, by the ASR system 104, a probability with a word in the language model.

In determining a frequency, the ASR system 104 may analyze input values. For example, the ASR system 104 may identify, in the plurality of inputs, a plurality of input values and may then identify a frequency with which each of the input values occurs in the plurality of inputs (e.g., out of 30 inputs, 15 have an input value of "high", 10 have an input value of "medium" and 5 have an input value of "low"; the frequency of selecting the input value of "high" might then be 50%).

Additionally, the ASR system 104 may analyze concepts associated with input values. For example, the ASR system 104 may identify, for one of the plurality of inputs, an input value, may determine that the input value is an instance of a concept, identify a number of instances of the concept, and identify a frequency with which the concept occurs in the plurality of inputs. As one example of this, a subset of the plurality of inputs may have input values such as "10/1/12" and "October 1, 2012", both of which are instances of the concept of Oct. 1, 2012. The ASR system 104 may identify the number of inputs that have input values that are instances of a particular concept (e.g., the concept of October 1, 2012, or the more general concept of a date), thereby identifying a frequency of occurrence of the concept within the input values. The ASR system 104 may also analyze a frequency with which an action occurs (e.g., opening or closing a file, executing a command, modifying a record, etc.), independent of the input value used to initiate the action. The ASR system 104 may use the identified frequency or frequencies to train the first language model.

Additionally or alternatively, the ASR system 104 may use the frequency to generate language models customized for different specialties; for example, a first language model may be used when a frequency of actions, input values, or concepts indicates that the inputs relate to prescribing medication by a first type of doctor (e.g., a pediatrician) and a second language model may be used when the frequency indicates that the inputs relate to prescribing medication by a second type of doctor (e.g., an oncologist). In such an embodiment, when the ASR system 104 determines that the application 140 is in a first state and determines to apply the first language model, the ASR system 104 may select the first language model from a plurality of customized language models that were trained based on the frequency of particular concepts. For example, in the case of an application 140 for managing electronic medical records (EMRs), or for a particular type of application 140, the ASR system 104 may apply a first language model trained based on EMR-related concepts including concepts such as, without limitation, "medication substance", "medication dosage", "medication frequency", and "allergen." Furthermore, and as described below, the ASR system 104 may analyze, and use in training language models, the frequency of actions, input values, or concepts identified within a plurality of inputs received from multiple users.

As another example, alternative spoken forms of the same term may be learned and used to generate and/or modify a language model automatically. For example, if speech pronounced as "PEE AY" and "PENNSYLVANIA" are both dictated into the same text field to produce the textual recognition result "PA," the system may learn that both such examples of speech are alternative spoken forms of the text "PA," and generate and/or modify an applicable language model appropriately. As yet another example, if a particular user interface element is known in advance to accept a particular term, such as the textual abbreviation "PA", as an input, but the correct pronunciation(s) of that abbreviation in a particular context are not known in advance, initially all (or a large number) of possible pronunciations may be permitted by an acoustic model that is applied to the user interface element. However, as particular pronunciations of the abbreviation "PA" are observed over time, the acoustic model may be narrowed down to permit (or favor) those pronunciations that are actually observed as input to the user interface element.

As yet another example, consider a text box that may accept freely typed text but which is designed to permit only one out of N possible inputs. For example, a text box that is used to input the name of a medication may be limited to accepting medication names, but the number of such permissible inputs may be in the thousands. The text box may be designed to display to the user the permissible completions of the text currently typed by the user so far. For example, if the user begins by typing "p" into the text box, the text box may display, beneath the text box, all of the permissible medication names that begin with the letter "p." As the user continues to type, only the permissible medication names that match the text typed so far by the user are displayed.

Embodiments of the present invention may learn the list of permissible medications in such an example by observing the inputs actually provided into the text box over time. This is merely one example of a case in which embodiments of the present invention may learn some or all of the N permissible inputs to a user interface element that requires that one out of N permissible inputs be input into the user interface element.

As mentioned above, each language model trained by embodiments of the present invention may be associated with one or more corresponding user interface elements so that each language model may be applied to recognize speech when its corresponding user interface element(s) have the input focus. Such associations between language models and user interface elements may be created and maintained in a variety of ways. For example, while the user is providing (speech and/or non-speech) input, embodiments of the present invention may observe any one or more of the following elements of "application data":

the application currently in the foreground (i.e., the application currently in focus);
 the state of the application currently in the foreground, such as which window, dialog box, or other user interface element(s) within the application are currently displayed; and
 the user interface elements(s) that currently have the input focus within the foreground application.

As the user provides (speech and/or non-speech input), such input may be observed, recorded, and associated with one or more elements of the application data described above. In some embodiments, the OS hooking component 108 observes, records and associates the input with the one or more elements of the application data. For example, if the user types text into a text field in a dialog box, then the OS hooking component 108 may create and store a record of any one or more of the following: (1) the text typed into the text field; (2) the application associated with the text field; (3) a list of user interface elements (e.g., windows and dialog boxes) currently displayed by the application; (4) the user interface element(s) currently having the input focus; and (5) the particular user interface element (e.g., text field) into which the text was typed. The same is true of any speech and/or non-speech input that may be provided by the user into any kind of user interface element. In determining whether to apply a first language model to a first speech input received by the application 140, the ASR system 104 may analyze application data to determine a state of the application 140. The ASR system 104 may compare the determined state of the application to a state associated with the first language model and determine whether the determined state and the state associated with the first language model are substantially the same state. Alternatively, the ASR system 104 may compare application data of the application with application data associated with the first language model (instead of, or in addition to, comparing states). As another alternative, the ASR system 104 may compare observed inputs to the application 140 with the speech input; if statistics about the inputs, such as the distribution of inputs, is sufficiently similar (e.g., meets or exceeds a predetermined threshold), the ASR system 104 may determine that the two states are substantially the same.

Such information, in addition to or instead of the frequency of certain types of inputs, input values, actions, and concepts as described above, may be recorded for multiple inputs by the same user or by multiple users into any single application or collection of applications. Such information may be recorded for input provided on a single computer or across multiple computers. For example, if a particular application (e.g., a particular word processor) executes on multiple computers, then input provided to multiple copies of that word processor on the multiple computers may be observed and used to generate and store the data described above. Such data may be aggregated to train language models that may be used with those multiple copies of the word processor across the multiple computers. The aggregation, training, and other steps may be performed on one or more of the computers executing the application (e.g., word processor), or on one or more other computers (such as servers) that do not execute the application.

In some embodiments, the language models are associated with particular user interfaces, or with particular user interface elements. For example, a first language model may be associated with a first user interface (and applied, e.g., when the application 140 is in a state in which it renders the first user interface) while a second language model may be associated with a second user interface (and applied, e.g., when the application 140 is in a state in which it renders the second user interface). However, and although in certain examples above it was stated that language models are associated with particular user interfaces or user interface elements, this is merely an example and does not constitute a limitation of the present invention. More generally, language models trained using the techniques disclosed herein may be associated with any one or more elements of the application data described above. For example, input into multiple user interface elements of a particular application may be used to train a language model that is associated with and then used to generate input for the application in general, i.e., for all user interface elements in the application. As another example, input into multiple user interface elements in a particular window or dialog box of a particular application may be used to train a language model that is associated with and then used to generate input for that window or dialog box in general, i.e., for all user interface elements in that window or dialog box.

More generally, a language model may be associated with a particular state or states of an application. A state may, but need not, be defined by reference to the user interface elements currently displayed by the application or the user interface elements currently having the input focus. Examples of states include, but are not limited to, time of day, weekday versus weekend, and on-shift versus off-shift. In cases in which multiple systems interoperate with each other (e.g., an EMR, radiology system, and a lab system), there typically is a context-sharing application that allows each application to communicate its own state to other applications. For example, if one application switches to editing data for a particular patient, then the context-sharing application communicates this new state to the other interoperating applications so that those applications can automatically switch to viewing and/or editing data for the same patient. Embodiments of the present invention may identify the current state based on information provided by such a context sharing application, and the identified current state may be used to identify, e.g., that the current state is now related to a diabetes patient. Such information may be used as the current state by embodiments of the present invention.

The method 200 includes determining that the application is in the first state 230. The ASR system 104 may evaluate application data associated with an application to determine what language model to apply. A language model selection component 120 may determine that the application is in the first state. The language model selection component 120 may also identify a language model from a plurality of language models for application to speech input when the application is in the first state.

As stated above, in some embodiments, some particular set of application data is associated with each language model. As the user provides input, embodiments of the present invention may gather information about the current state of the system and compare that information to the application data associated with various language models. By way of example, the ASR system 104 may analyze application data to determine a state of the application, compare the determined state of the application to a state associated with the first language model, and determine that the determined state and the state associated with the first language model are substantially the same state. If the state associated with a particular language model is determined to match the current state of the system (according to some predetermined criteria), then the matching language model is applied to speech input received from the user. Alternatively, and by way of example, the ASR system 104 may compare application data of the application with application data associated with the first language model (without, for example, determining a state of the application), and determine that the application data and the data associated with the first language model are substantially the same state. For example, if a particular dialog box is determined to be displayed and a particular text field within that dialog box is determined to have the input focus, and if a language model associated with that text field exists, then that language model is applied to speech input received from the user to generate text input into the text field.

In some embodiments, the ASR system 104 determines whether to apply a language model based on analyzing a number of inputs, which may include using a threshold to evaluate whether to apply the language model. For example, the ASR system 104 may analyze a plurality of inputs to a user interface to identify how many of the plurality of inputs are associated with the language model; this association may be direct (e.g., "October 1, 1993" is directly associated with a "date" grammar) or indirect (e.g., "10/01/1993" is associated a "date" concept of "MM/DD/YYYY" and the "date" concept is associated with the "date" grammar). The ASR system 104 may determine that if a number of the plurality of inputs associated with the language model exceeds a predefined threshold, the ASR system 104 should apply the language model to inputs to the user interface. As another example, the ASR system 104 may determine that if a percentage of the plurality of inputs associated with the language model exceeds a predefined threshold, the ASR system should apply the language model to inputs to the user interface. As a further example, the ASR system 104 may evaluate multiple factors in determining whether to apply the language model; for instance, the ASR system 104 may be configured to analyze inputs after receiving a threshold number of inputs and may be configured to determine to apply the language model after determining that a threshold subset of the analyzed inputs are associated with the language model (e.g., the ASR system 104 analyzes inputs after receiving 10 inputs to the user interface and determines to apply the language model if 75% of the received inputs are associated with the language model.

The method 200 includes applying the first language model to a first speech input in response to determining that the application is in the first state 240. In one embodiment, the language model application component 130 applies the first language model to the first speech input in response to a determination by the language model selection component 120 that the application is in the first state. The ASR system 104 may apply a language model when, for example, the text field has the input focus, or when the dialog box, window, or other user interface element containing the text field has the focus. Embodiments of the present invention may, for example, use introspection to determine which user interface element currently has the input focus and then apply a corresponding language model when recognizing speech to create input into that user interface element. As this example illustrates, the techniques used by embodiments of the present invention may be used in conjunction with conventional techniques for using introspection, both during observation to train language models and after training, during application of the trained language models during speech recognition.

Note that although training may be performed in a first step and then be followed by application of trained language models, alternatively training may be ongoing, so that language models are continually trained and updated in response to observations, and so that such language models immediately become available for use. In other words, an observation of an input into a particular user interface element may be used to generate and/or update a language model associated with that user interface element, and the language model may then be applied during speech recognition to generate input into that user interface element. Subsequent input into the same user interface element may then be used to update the associated language model, and the updated language model may then be applied during speech recognition to generate subsequent input into the same user interface element. This process may repeat any number of times.

Language models need not be activated immediately. Instead, for example, a particular language model may only be activated upon being trained with a certain minimum amount of training data, or after some minimum degree of confidence in the accuracy of the language model has been achieved. Any metric may be used to determine whether and when to activate a particular language model for use.

The ASR system 104 may provide, to the application 140, a result of applying the first language model to the first speech input. In doing so, the ASR system 104 may leverage conventional techniques discussed above such as keyboard emulation, clipboard transfer, operating system messaging, pointing device emulation, and introspection to provide the result to the application 140. For example, the ASR system 104 may emulate a keyboard event to submit either a text input or a control sequence to the application 140 or the ASR system 104 may emulate a pointing device event to submit either the text input or the control sequence to the application 140. As another example, the ASR system 104 may post the result to a clipboard buffer maintained by the operating system 150 so that the application 140 can receive the result from the clipboard buffer; this may be done in conjunction with, by way of example, keyboard or pointing device emulation (e.g., the ASR system 104 posts the result to the clipboard buffer and emulates a keyboard command instructing the application 140 to retrieve the result from the clipboard buffer). As a further example, the ASR system 104 generates an operating system message including the result and transmits the operating system message to the application. The ASR system 104 may also use introspection to identify a user interface having input focus and provide the result to the identified user interface. In each of these examples, the OS hooking component 108 may provide the functionality needed to provide the result to the application 140.

The ASR system 104 may be provided as a single application or as a distributed system including a plurality of sub-applications each providing different functionality or, for the sake of redundancy and fail-over capability, providing the same functionality. In some instances, the ASR system 104 may be in communication with a client agent (not shown); for example, in an embodiment in which the ASR system 104 executes on a first computing device 102 and receives a second plurality of inputs provided to an application executing on a second computing device 102b for use in training the first language model, the system may include a client agent executing on the second computing device 102b, retrieving the second plurality of inputs and transmitting the second plurality of inputs to the ASR system 104. As another example, in an embodiment in which the ASR system 104 executes on a first computing device and receives the first plurality of inputs provided to an application 140 but the application 140 executes on a second computing device 102b, when the ASR system 104 applies the language model to the speech input and generates a result, the ASR system 104 may transmit the result to a client agent executing on the second computing device 102b that provides the result, directly or indirectly, to the application 140.

Embodiments of the present invention have a variety of advantages. For example, embodiments of the present invention may be used to achieve higher speech recognition accuracy by observing usage patterns that are dependent upon the state of applications to which speech recognition output is provided, and by tailoring the language models that are used to generate such speech recognition output to those application states. In particular, embodiments of the present invention may observe the relative frequencies of different inputs in different application states, and tailor language models for use in those application states based on the observed relative frequencies. Each tailored language model may then be applied to speech input when the application is in the state associated with that language model. The resulting speech recognition output is likely to be more accurate than if a generic language model (i.e., a language model not dependent on application state) were applied in all states of the application.

Such benefits may be obtained automatically and without requiring tight integration of the automatic speech recognition system and the target application. Rather, the accuracy of the ASR system 104 may improve automatically over time in response to observation of user input, without the need to manually configure the ASR system 104 with any predetermined knowledge of the states of the application, such as knowledge of the various user interfaces used by the application. Embodiments of the present invention may, however, leverage existing introspection-based techniques for identifying the current state of the application and for identifying permissible inputs into the application during particular states of the application, to further improve speech recognition accuracy.

A related benefit of embodiments of the present invention is that they continuously improve over time as additional observations are made. Yet another related benefit of embodiments of the present invention is that they may be applied across users and across computers. For example, input provided by one user to a particular application may be used to train language models for use with that application, even when other users provide input to that application, and even when that application is executed on other computers. Yet another related benefit of embodiments of the present invention is that trained language models may be associated with application states that are defined at any level of granularity, ranging from the application as a whole down to the level of individual user interface elements (e.g., text boxes or dropdown lists).

Another advantage of embodiments of the present invention is that they may be used to selectively enable or disabled trained language models to maximize speech recognition accuracy. For example, as mentioned above, although all trained language models may be put into use immediately, alternatively individual language models may be selectively enabled (either manually or automatically) only once they have satisfied some predetermined criteria, such as by having been trained using some minimum amount of training data. Conversely, language models that have been enabled may be disabled (either manually or automatically) if they are determined to have satisfied some predetermined criteria, such as if confidence in the accuracy of the language model falls below some minimum confidence level. As a result, embodiments of the present invention may be used to selectively apply observation-trained language models only in those circumstances in which they are most useful for improving speech recognition accuracy.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

The invention claimed is:

1. A computer-implemented method, comprising:
receiving, by an automatic speech recognition system executed by one computer processor, a first plurality of inputs into an application while the application is in a first state;
training, by the automatic speech recognition system, a first language model based on the received first plurality of inputs;
determining, by the automatic speech recognition system, that the application is in the first state; and
applying, by the automatic speech recognition system, the first language model to a first speech input in response to determining that the application is in the first state,
wherein the automatic speech recognition system is executed on a first computing device, and wherein the application is executed on a second computing device different from the first computing device;
wherein training the first language model further comprises:
identifying a pattern of use of a user interface associated with the received first plurality of inputs, wherein the identification is performed by an operating system hooking component included in the speech recognition system by intercepting messages between the said user interface and the computer processor's operating system; and modifying the first language model based on the identified pattern of use.

2. The method of claim 1, wherein training the first language model further comprises associating a probability with a word in the first language model based on preceding words of the word.

3. The method of claim 1, wherein applying the first language model further comprises applying the first language model to the first speech input if a number of the first plurality of inputs associated with the first language model exceeds a predefined threshold.

4. The method of claim 1, wherein training the first language model further comprises:
    receiving a second plurality of inputs into another copy of the application, while the another copy of the application is in the first state and executing on a different computing device than a computing device on which the first plurality of inputs is received; and
    modifying the first language model based on the received second plurality of inputs.

5. The method of claim 1, wherein training the first language model further comprises associating a probability with a word in the first language model.

6. The method of claim 1, wherein determining that the application is in the first state further comprises:
    analyzing application data to determine that the application is in the first state;
    comparing the determined first state of the application to a state associated with the first language model; and
    determining that the determined first state of the application and the state associated with the first language model are substantially a same state.

7. The method of claim 1, wherein determining that the application is in the first state further comprises:
    comparing application data of the application to application data associated with the first language model; and
    determining that the application data of the application and the application data associated with the first language model are a same data.

8. The method of claim 1, wherein applying the first language model further comprises applying the first language model to the first speech input after achieving a degree of confidence in a level of accuracy of the first language model.

9. An automated speech recognition system, comprising:
    means for receiving a first plurality of inputs into an application while the application is in a first state;
    means for training a first language model based on the received first plurality of inputs;
    means for determining that the application is in the first state; and
    means for applying the first language model to a first speech input in response to determining that the application is in the first state,
    wherein the automatic speech recognition system is executed on a first computing device by a computer processor, and wherein the application is executed on a second computing device different from the first computing device;
    wherein training the first language model further comprises:
        identifying a pattern of use of a user interface associated with the received first plurality of inputs,
        wherein the identification is by an operating system hooking component included in the speech recognition system by intercepting messages between the said user interface and the computer processor's operating system; and
        modifying the first language model based on the identified pattern of use.

10. The automated speech recognition system of claim 9, further comprising an operating system hooking component receiving the first plurality of inputs from at least one of a text-based input device, a pointing device, and a speech input device.

11. The automated speech recognition system of claim 9, further comprising means for providing, to the application, a result of applying the first language model to the first speech input.

12. The automated speech recognition system of claim 9, further comprising means for modifying a resource accessed by the first language model, based on the received first plurality of inputs.

13. A non-transitory computer readable medium storing computer program instructions which, when executed by at least one computer processor, causes the at least one computer processor to:
    receive, by an automatic speech recognition system executed by the at least one computer processor, a first plurality of inputs into an application while the application is in a first state;
    train, by the automatic speech recognition system, a first language model based on the received first plurality of inputs;
    determine, by the automatic speech recognition system, that the application is in the first state; and
    apply, by the automatic speech recognition system, the first language model to a first speech input in response to determining that the application is in the first state,
    wherein the automatic speech recognition system is executed on a first computing device, and wherein the application is executed on a second computing device different from the first computing device;
    wherein training the first language model further comprises:
        identifying a pattern of use of a user interface associated with the received first plurality of inputs,
        wherein the identification is by an operating system hooking component included in the speech recognition system by intercepting messages between the said user interface and the computer processor's operating system; and
        modifying the first language model based on the identified pattern of use.

14. The non-transitory computer readable medium of claim 13, further comprising computer program instructions causing the at least one computer processor to:
    identify, in the received first plurality of inputs, a plurality of input values;
    identify a frequency with which each of the plurality of input values occurs in the first plurality of inputs; and
    train the first language model based on the identified frequency with which each of the plurality of input values occurs in the first plurality of inputs.

15. The non-transitory computer readable medium of claim 13, further comprising computer program instructions causing the at least one computer processor to:

identify, for one of the received first plurality of inputs, an input value;
determine that the input value is an instance of a concept;
identify, in the received first plurality of inputs, a number of instances of the concept;
identify a frequency with which the concept occurs in the received first plurality of inputs; and
train the first language model based on the identified frequency with which the concept occurs in the received first plurality of inputs.

16. The non-transitory computer readable medium of claim 13, further comprising computer program instructions causing the at least one computer processor to:
identify, by an operating system hooking component, a user interface element into which one of the first plurality of inputs is provided; and
associate the first language model with the identified user interface element.

17. The non-transitory computer readable medium of claim 13, further comprising computer program instructions causing the at least one computer processor to:
identify, by an operating system hooking component, a plurality of user interface elements displayed by the application associated with a user interface element into which one of the first plurality of inputs is provided; and
associate the first language model with the identified plurality of user interface elements.

18. The non-transitory computer readable medium of claim 13, further comprising computer program instructions causing the at least one computer processor to:
identify, by an operating system hooking component, a user interface element displayed in a foreground of a graphical user interface; and
associate the first language model with the identified user interface element.

19. The non-transitory computer readable medium of claim 13, further comprising computer program instructions causing the at least one computer processor to:
identify, by an operating system hooking component, a state of a user interface element displayed in a foreground of a graphical user interface; and
associate the first language model with the identified user interface element.

* * * * *